United States Patent [19]

Irvin

[11] Patent Number: 4,986,487

[45] Date of Patent: Jan. 22, 1991

[54] APPARATUS FOR DISPENSING AND RETRACTING TAPE

[76] Inventor: Mark A. Irvin, 8401 Falcon Cir., Angier, N.C. 27501

[21] Appl. No.: 334,543

[22] Filed: Apr. 7, 1989

[51] Int. Cl.$^5$ ............................................. B65H 75/48
[52] U.S. Cl. ................................................... 242/107.5
[58] Field of Search ............................ 242/107.5, 84.8

[56] References Cited

U.S. PATENT DOCUMENTS

| | | | |
|---|---|---|---|
| 897,977 | 9/1908 | Grant | 242/107.5 |
| 962,708 | 6/1910 | Kappenberg | 242/107.5 X |
| 2,160,734 | 5/1939 | Henriksen | 242/107.5 |
| 2,596,648 | 5/1952 | Bugg et al. | 242/107.5 |
| 4,531,688 | 7/1985 | Gall | 242/107.5 X |
| 4,730,783 | 3/1988 | Lamson | 242/107.5 X |

FOREIGN PATENT DOCUMENTS 998218  7/1965  United Kingdom ............ 242/107.5

Primary Examiner—Joseph J. Hail, III
Attorney, Agent, or Firm—Kenyon & Kenyon

[57] ABSTRACT

The disclosed invention relates to an automatic retracting tape measure with torsional bias adjustment. The spring for imparting the requisite bias is attached to a spindle within the tape measure housing. A portion of the spindle is exposed for actuation by a tool external to the housing to increase the bias on the spring as may be necessary.

7 Claims, 2 Drawing Sheets

APPARATUS FOR DISPENSING AND RETRACTING TAPE

BACKGROUND AND DISCUSSION OF THE INVENTION

There are numerous automatic retracting tape measure devices on the market to facilitate dispensing and retraction of tape. Often these devices incorporate an internal coil spring with one end attached to a spindle and the other end attached to a tape spool. The retraction feature results from the torsional bias imparted to the spool by the coil spring. Since the spindle is permanently fixed to the tape case the force imparted to the internal coil spring is generally constant and cannot be readily altered after assembly.

Certain assembly problems arise from the need to impart the requisite bias to the coil spring. The bias force must necessarily be imparted to the coil spring before the tape case is fully assembled. Assembly procedures often require partial assembly, with the tape spool end of the coil spring held in place, and the partial assembly rotated until the proper force is imparted upon the internal coil spring before the tape case itself can be fully assembled. This method of manufacture, which is necessitated by the structure of the device itself, frustrates automated assembly. These devices can lose their retracting ability when the internal coil spring begins to lose its resiliency. To compensate for this loss of resiliency a re-assembly or a re-manufacturing of the device is required.

The present invention overcomes the disadvantages discussed above by providing for a construction which permits adjustment of spring torsion after assembly. The construction of the invention facilitates automated assembly, without any change in the outward appearance of the device to the consumer.

As described in the preferred embodiment, the invention includes a ratchet wind retracting device with an externally accessible spindle. A ratchet assembly locks against the case to permit rotational movement of the spindle in one direction only. This allows the internal coil spring to be wound toward greater torsional bias after the case has been fully assembled. The features of such a ratchet assembly accomplish several objectives: (1) the new method of assembly allowed by the novel structure of this ratchet wind retracting device will facilitate the speed of automated production of the device; (2) the internal coil spring can be tightened from the exterior of the case as it loses its resiliency and its ability to effectively retract the tape; and (3) the force imparted upon the internal coil spring can be released and the spring unwound as the case is loosened, prior to disassembly.

DETAILED DESCRIPTION OF THE PREFERRED EMBODIMENT

Figure 1:
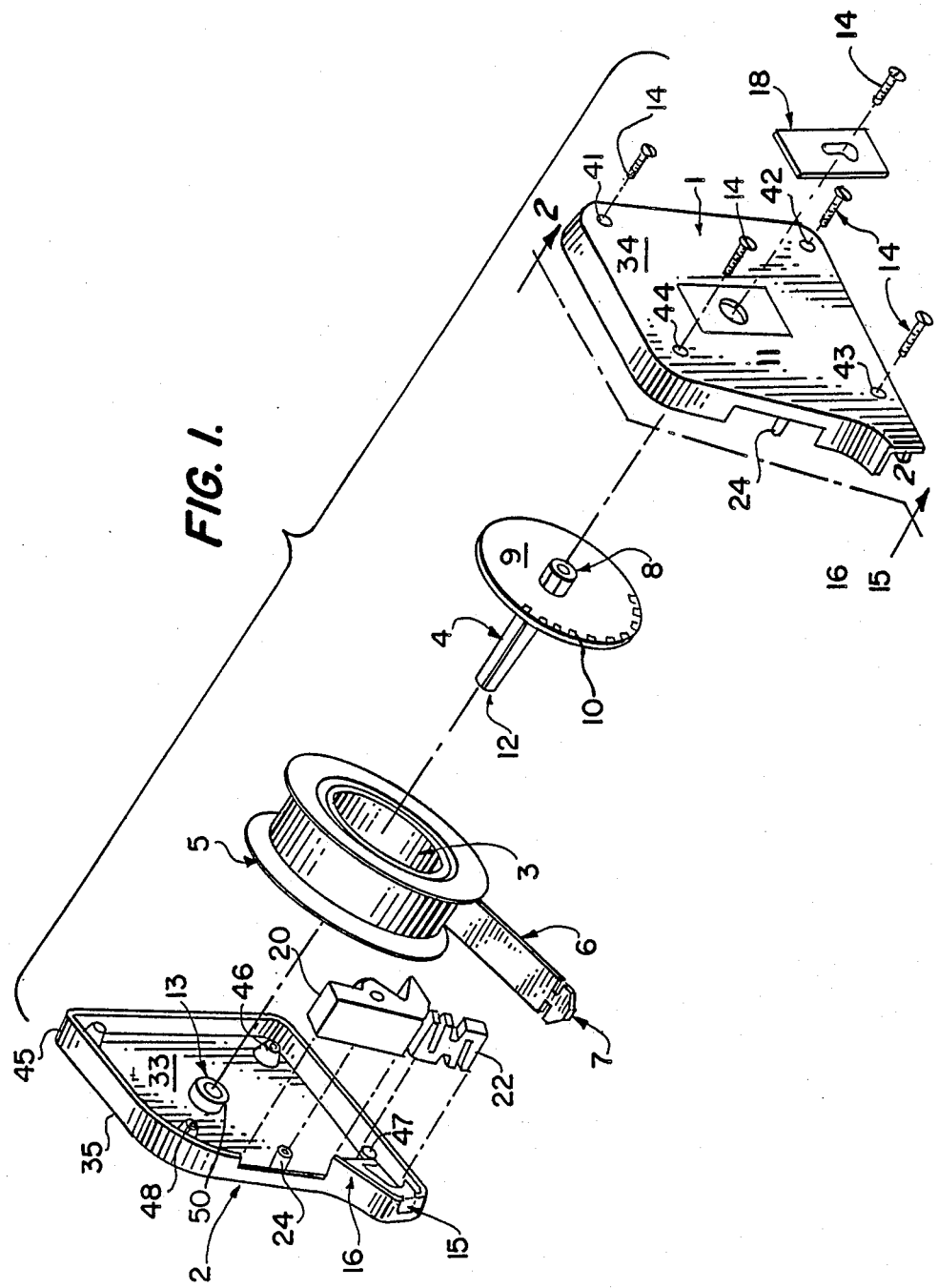
FIG. 1 is an exploded view of the ratchet wind retracting device.
Figure 2:
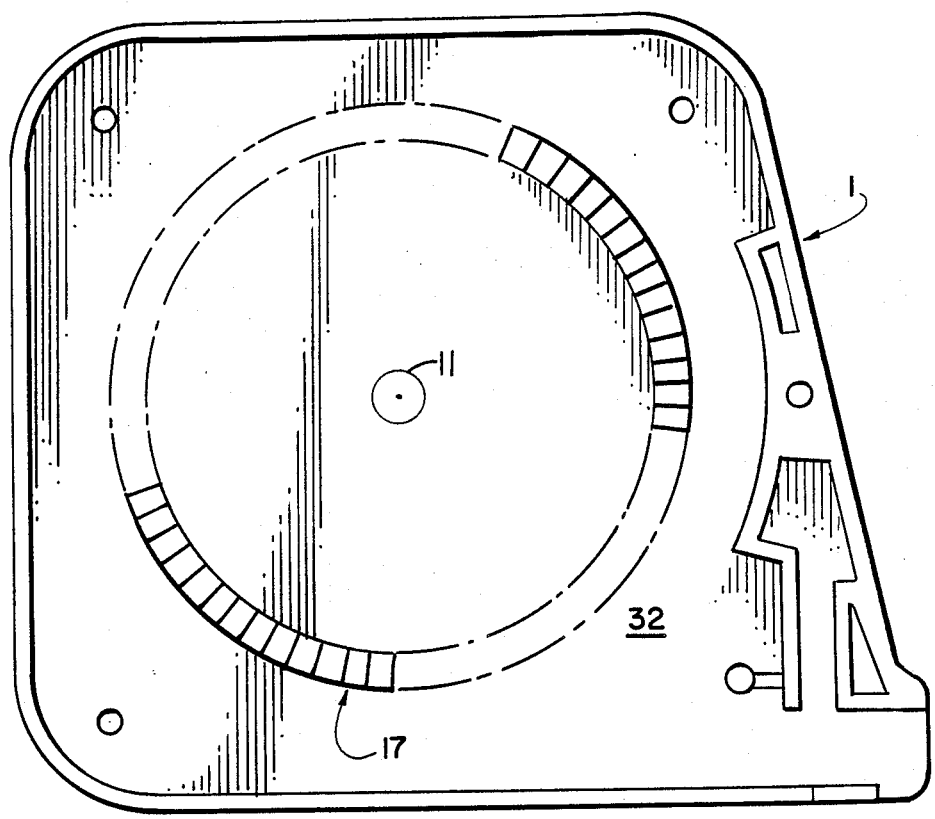
FIG. 2 is a side view of an inner face of the device shown in FIG. 1 taken along lines 2—2.
Figure 3:
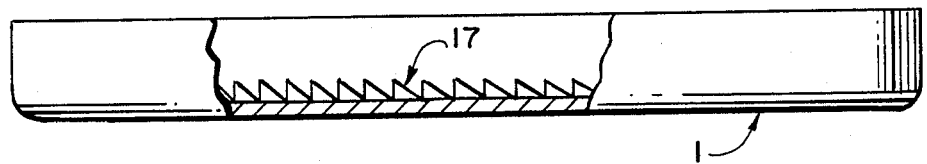
FIG. 3 is an end view of the device shown in FIG. 2.

Referring to FIGS. 1 and 2 of the drawings, the ratchet wind retracting device includes a housing formed from a first case half member 1 and a second case half member 2 which, when assembled, combine to house the internal retracting assembly. Housing members 1,2 each have internal surfaces 32,33 and external surfaces 34,35. Internal surface 33 has four recessed studs 45,46,47,48 for receiving in threaded engagement screws 14. Case half 1 has four holes 41,42,43,44 which register with studs 45,46,47,48. Internal coil spring 3 is attached at one end to a ratcheted spindle 4 and at its other end to an inner surface of a hollow spool 5. An elongated tape 6 is attached at one end to the outer surface of the hollow spool member 5. Tape 6 further includes stopping member 7 attached to its other end distal from the end attached to the spool. The ratchet spindle 4 has at one end means 8 for engaging a tool to accomplish torsional rotation of the ratcheted spindle member, a radial disc 9 upon which are outwardly protruding ratchet teeth located in a circular configuration.

When fully assembled, the engaging means 8 of the ratcheted spindle member 4 is accessible through an opening 11 in the first case half member 1, and the opposite end 12 of the ratcheted spindle member 4 is inserted into an outwardly protruding receiving member 13 which is located upon the inner face of the second case half member 2. The case formed by the first case half member 1 and the second case half member 2 is held together by fastening means 14, and the notched portions 15 of the inwardly protruding circumferential edges 16 of the first case half member 1 and the second case half member 2 form an opening through which the elongated retracting member is pulled out and retracted into the case. Actuator 20 is pinned for rotation on opposing studs 24, 26 extending from case halves 1, 2 respectively. Actuator 20 is movable between an open and closed position to effect corresponding movement of tape engaging member 22 to hold the tape in a selected position when closed and to permit retraction when open.

Ratchet assembly 30 cooperates with the housing and the spool 5 to permit external adjustment of torsion. In this embodiment, ratchet assembly has a shaft comprising a spindle 4 with slot 12 therethrough for attachment of coil spring 3. Spindle 4 can be releasably secured with disc 9 or integrally formed therewith. Adjacent one end of the spindle is disc 9; the other end is constructed for fitting into complementary recess 50 of journal 13 arranged on internal surface 33.

In opposed housing member 1, opening 11 is defined to support stud 8 of spindle 4. Disc 9 includes a number of equally spaced ratchet teeth 10 located adjacent the periphery of the disc. The internal surface 32 of housing member 2 includes corresponding ratchet teeth 17, which can be integrally formed with housing member 2, for engagement with those features of disc 9. The disc 9, disc teeth 10, and housing member ratchet teeth 17 cooperate to permit movement or rotation of the spindle and ultimately sprinq 3 in one direction.

When completely assembled, stud 8 extends through hole 11 in housing member 1, and is exposed for engagement by the appropriate tool. In this embodiment, stud 8 includes a hex head which can be engaged by a wrench. Once assembled and bias on spring is adjusted, the stud 8 is covered by belt clip 18 or other more ornamental fixture.

This torsional rotation can be accomplished only in one direction due to the one-way locking mechanism. For this purpose ratchet teeth 10, acting in conjunction with the opposing set of ratchet teeth 17, are located in a circular configuration upon the inner face of the first case half member 1. Once the desired force has been imparted upon the coil spring member 3 in this fashion, the optional open-ended member 18 may be attached. With ratchet teeth 10 and ratchet teeth 17 set in an opposing and locked relationship, elongated retracting member or tape 6 can be pulled out from the case through the opening formed by notched portions 15, and the elongated retracting member may then either be first clamped and held in position by the actuator and released for automatic retraction or immediately automatically retracted without use of the clamping member.

In preparation for assembly, tape 6 is wrapped about spool 5 as shown. Coil spring 3 is then filled into the hollow portion of spool 5 with one end fixed to the spool and the other fixed to spindle 4 by inserting the spring into the seat. The spindle is then placed through the center of the spool, and the spool and spindle assembly is placed adjacent housing member 1 with the distal end of spindle in journal 13. Housing member 2 is then placed over the spool assembly with holes 41, 42, 43, 44 in registry with studs 45, 46, 47 and 48. The tape, prior to assembly of the housing halves is partially extended through the opening for that purpose. The screws 14 are then inserted into the threaded portions of the studs to fasten the housing portions together.

With this assembly, spring 3 does not provide sufficient torsional bias on the spool 5. The engaging means 8, in this case a hex head, extends through opening 11 in case half 1 for actuation by the appropriate tool. The hex head 8 is then rotated until the desired bias on spring 3 is obtained. After adjusting the bias, a belt clip 18 is then fixed to the housing in any convenient manner.

The above is a discussion of the preferred embodiment. The full scope of applicant's invention is defined in the claims that follow and their equivalents. In this regard the specification should not be construed to unduly limit the scope of invention to which the inventor is entitled.

What is claimed is:

1. A device for dispensing and retracting tape comprising:
    a housing having a first half and a second half, each half having an inner wall and an outer wall, the inner wall of said first half having an aperture formed therethrough and a ratchet member disposed about said aperture, said housing including an opening through which tape can be dispensed or retracted;
    a ratcheted spindle assembly including a disc having a first side facing said first housing half and a second side facing said second housing half, a spindle having a first end extending from said second side and a second end journaled in said second housing half, a stud extending from said first side and a ratchet member arranged in the peripheral region of said first side, said stud having a portion extending through said aperture in said first housing half such that said ratchet member on said first half member engages the ratchet member on said disc;
    a spool rotatably supported in said housing for supporting said tape;
    a coiled spring retained in said spool, said spring having a first portion coupled to said spindle and another portion coupled to said spool; and
    means releasably mounted on the outer wall of said first member and over said stud for covering and preventing rotation of said stud.

2. The device of claim 1, wherein said means comprises a belt clip.

3. The device of claim 2, wherein said belt clip includes a hole and said stud extends into said hole.

4. The device of claim 3, wherein a fastener extends into said hole and couples said belt clip to said stud.

5. The device of claim 1, wherein said stud portion includes a hexagonal socket for cooperation with a wrench to rotate the spindle assembly and increase the torsional bias of said coiled spring.

6. The device of claim 1, wherein each ratchet member includes ratchet teeth arranged in a circular configuration.

7. The device of claim 1, wherein said spindle is completely disposed in said housing with its second end in abutment with the inner wall of said second housing half, said spindle assembly being dimensioned such that said disc and spindle are compressed between said housing halves thereby maintaining said ratchet members in engagement with one another.

* * * * *